(12) United States Patent
Zhang

(10) Patent No.: US 10,378,413 B2
(45) Date of Patent: Aug. 13, 2019

(54) UREA MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 318 days.

(21) Appl. No.: 15/214,974

(22) Filed: Jul. 20, 2016

(65) Prior Publication Data

US 2018/0023447 A1 Jan. 25, 2018

(51) Int. Cl.
| | | |
|---|---|---|
| *F01N 3/28* | (2006.01) | |
| *F01N 3/20* | (2006.01) | |
| *B01F 5/04* | (2006.01) | |
| *B01F 5/06* | (2006.01) | |
| *B01F 3/04* | (2006.01) | |
| *B01F 5/00* | (2006.01) | |

(52) U.S. Cl.
CPC ........ *F01N 3/2892* (2013.01); *B01F 3/04049* (2013.01); *B01F 5/048* (2013.01); *B01F 5/0451* (2013.01); *B01F 5/0473* (2013.01); *B01F 5/0498* (2013.01); *B01F 5/0688* (2013.01); *B01F 5/0689* (2013.01); *F01N 3/2066* (2013.01); *B01F 2005/0034* (2013.01); *F01N 2240/20* (2013.01); *F01N 2610/02* (2013.01); *F01N 2610/1453* (2013.01); *Y02T 10/24* (2013.01)

(58) Field of Classification Search
CPC .. F01N 3/2066; F01N 3/2892; F01N 2610/02; F01N 2610/1453
See application file for complete search history.

(56) References Cited

U.S. PATENT DOCUMENTS

| | | | |
|---|---|---|---|
| 6,449,947 B1* | 9/2002 | Liu ................... | B01D 53/9431 60/286 |
| 7,497,077 B2 | 3/2009 | Dodge et al. | |
| 7,568,340 B2 | 8/2009 | Marsal et al. | |
| 7,712,307 B2* | 5/2010 | Braun ................... | F01N 3/0231 60/297 |
| 2006/0245296 A1* | 11/2006 | Nishioka ............ | B01D 53/8631 366/174.1 |
| 2007/0022744 A1* | 2/2007 | Hemingway ........... | F01N 3/033 60/286 |
| 2007/0036694 A1* | 2/2007 | Nishioka ................ | B01D 53/90 422/168 |

(Continued)

FOREIGN PATENT DOCUMENTS

| | | | |
|---|---|---|---|
| CN | 104074637 A | | 10/2014 |
| EP | 0363684 | * | 9/1989 |

OTHER PUBLICATIONS

Zhang, Xiaogang, "System for a Urea Mixer," U.S. Appl. No. 14/945,122, filed Nov. 18, 2015, 30 pages.

(Continued)

*Primary Examiner* — Laert Dounis
*Assistant Examiner* — Matthew T Largi
(74) *Attorney, Agent, or Firm* — Julia Voutyras; McCoy Russell LLP

(57) ABSTRACT

Methods and systems are provided for a urea mixer. In one example, a urea mixer may include a tube for mixing exhaust gas with urea outside of a main exhaust passage.

18 Claims, 4 Drawing Sheets

(56) References Cited

U.S. PATENT DOCUMENTS

| | | | |
|---|---|---|---|
| 2007/0101703 A1* | 5/2007 | Kanaya | B01D 53/9431 60/286 |
| 2007/0231232 A1* | 10/2007 | Lin | B01D 53/8631 423/235 |
| 2013/0104531 A1 | 5/2013 | Cho et al. | |
| 2013/0167516 A1* | 7/2013 | Loman | F01N 3/2892 60/319 |
| 2014/0033686 A1* | 2/2014 | Fischer | B01F 3/04049 60/286 |
| 2015/0047330 A1 | 2/2015 | Zhang | |

OTHER PUBLICATIONS

Zhang, Xiaogang, "Exhaust Gas Mixer," U.S. Appl. No. 14/823,700, filed Aug. 11, 2015, 47 pages.

* cited by examiner

UREA MIXER

FIELD

The present description relates generally to methods and systems for a urea mixer.

BACKGROUND/SUMMARY

One technology for after-treatment of engine exhaust utilizes selective catalytic reduction (SCR) to enable certain chemical reactions to occur between $NO_x$ in the exhaust and ammonia ($NH_3$). $NH_3$ is introduced into an engine exhaust system upstream of an SCR catalyst by injecting urea into an exhaust pathway, or is generated in an upstream catalyst. The urea entropically decomposes to $NH_3$ under high temperature conditions. The SCR facilitates the reaction between $NH_3$ and $NO_x$ to convert $NO_x$ into nitrogen ($N_2$) and water ($H_2O$). However, as recognized by the inventor herein, issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between emissions (e.g., $NO_x$) and the SCR. Additionally, overly mixing and agitating the urea in the exhaust can likewise cause issues, such as increased deposits.

Attempts to address insufficient mixing include introducing a mixing device downstream of a urea injector and upstream of the SCR such that the exhaust flow may be more homogenous. Other attempts to address urea mixing include a stationary mixing apparatus. One example approach is shown by Cho et al. in U.S. 2013/0104531. Therein, a static mixer is located in an exhaust passage downstream of an auxiliary tube for injecting urea. The exhaust gas flows through the exhaust passage and combines with a urea injection before flowing through the static mixer.

However, the inventors herein have recognized potential issues with such systems. As one example, the static mixer described above presents limited mixing capabilities due to a directionality of exhaust outflow through the mixer unable to fully mix a laminar exhaust flow. The static mixer inside the exhaust passage also presents manufacturing and packaging constraints. Varying exhaust passage geometries demand an alteration in the manufacturing of the static mixer for the mixer to tightly fit within the exhaust passage. Additionally, the static mixer of Cho does not provide a passage outside of a main exhaust passage for mixing a portion of exhaust gas with the urea injection. As such, the static mixer of Cho may overly agitate the urea injection, which may lead to urea deposits and poor coating of the SCR.

In one example, the issues described above may be addressed by a mixer comprising a concave plate located inside an exhaust passage with an opening fluidly coupling the exhaust passage to an auxiliary passage having a urea injector, and where the auxiliary passage is fluidly coupled to a hollow ring physically coupled to an outer surface of the exhaust passage, and where the hollow ring is upstream of the concave plate relative to a direction of incoming engine exhaust gas flow. In this way, a distance of exhaust gas flow is increased compared to an exhaust pipe without the mixer such that mixing is further increased.

As one example, exhaust gas is received by an opening located along a smallest diameter of the concave plate and conducted into a first tube of the auxiliary passage. The auxiliary passage conducts the exhaust gas from the first tube, located in the exhaust passage, to a second tube of the auxiliary passage with a first portion located inside the exhaust pipe and a second portion located outside the exhaust pipe. The second tube further comprises the urea injector located at an intersection between the second tube and a third tube outside of the exhaust pipe. The third tube is configured to flow the exhaust gas and urea mixture to the hollow ring, where the mixture may flow to an annular chamber, located uninterruptedly around an outside of the exhaust pipe. The mixture may flow into the exhaust passage via a plurality of perforations located along a portion of the exhaust pipe corresponding to a location of the hollow ring. Once the mixture is in the exhaust passage, it may flow toward the concave plate, where the mixture may flow through either the opening or through a plurality of perforations leading to an SCR device. In this way, urea dispersion in the exhaust passage may be increased, thereby improving an overall reduction of the SCR device.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-4 are shown approximately to scale, although other relative dimensions may be used.

DETAILED DESCRIPTION

Figure 1:
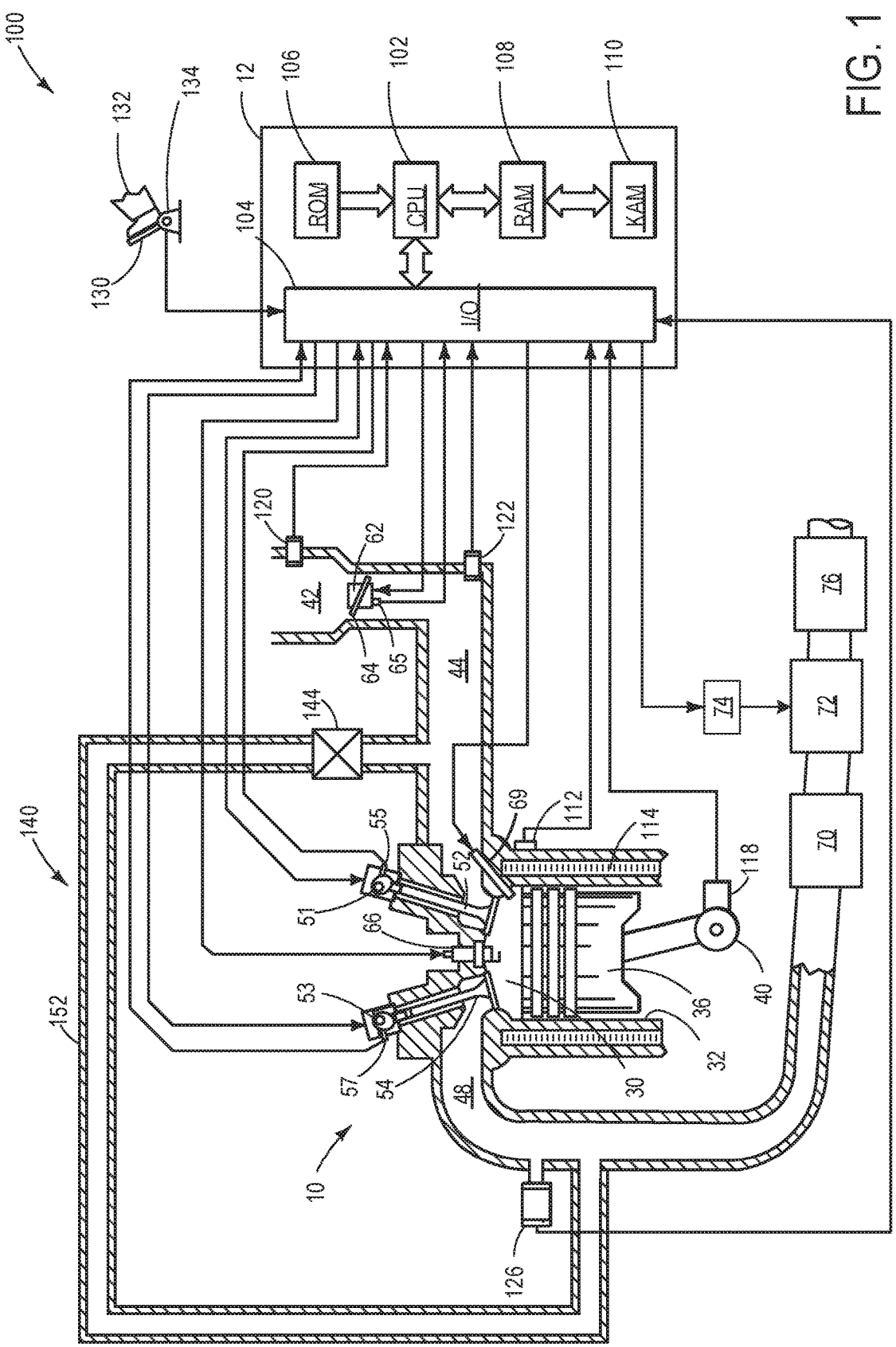
FIG. 1 shows a schematic view of an engine with a mixer.
Figure 2:
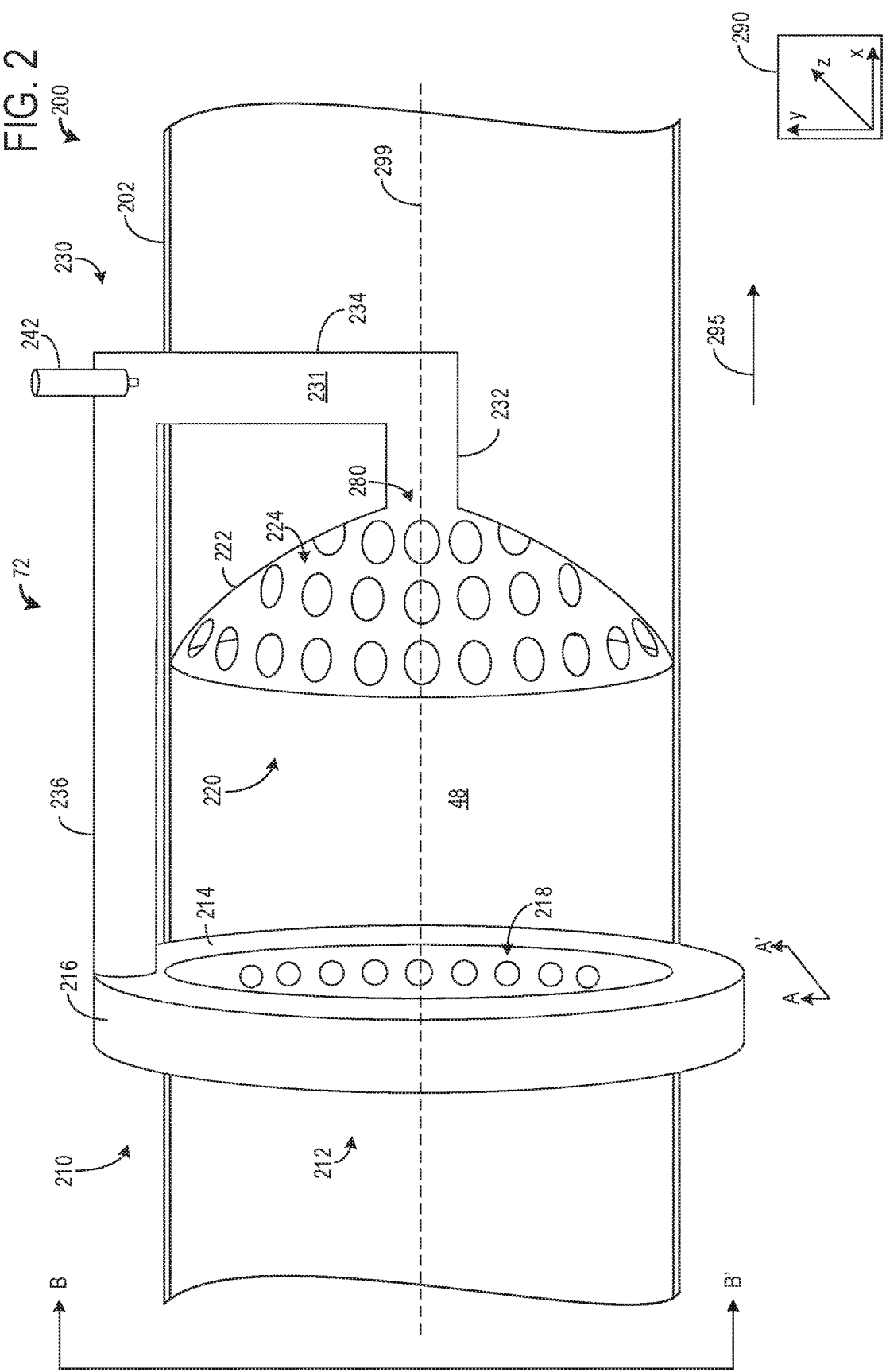
FIG. 2 shows an isometric view of the mixer located along an exhaust passage.
Figure 3:
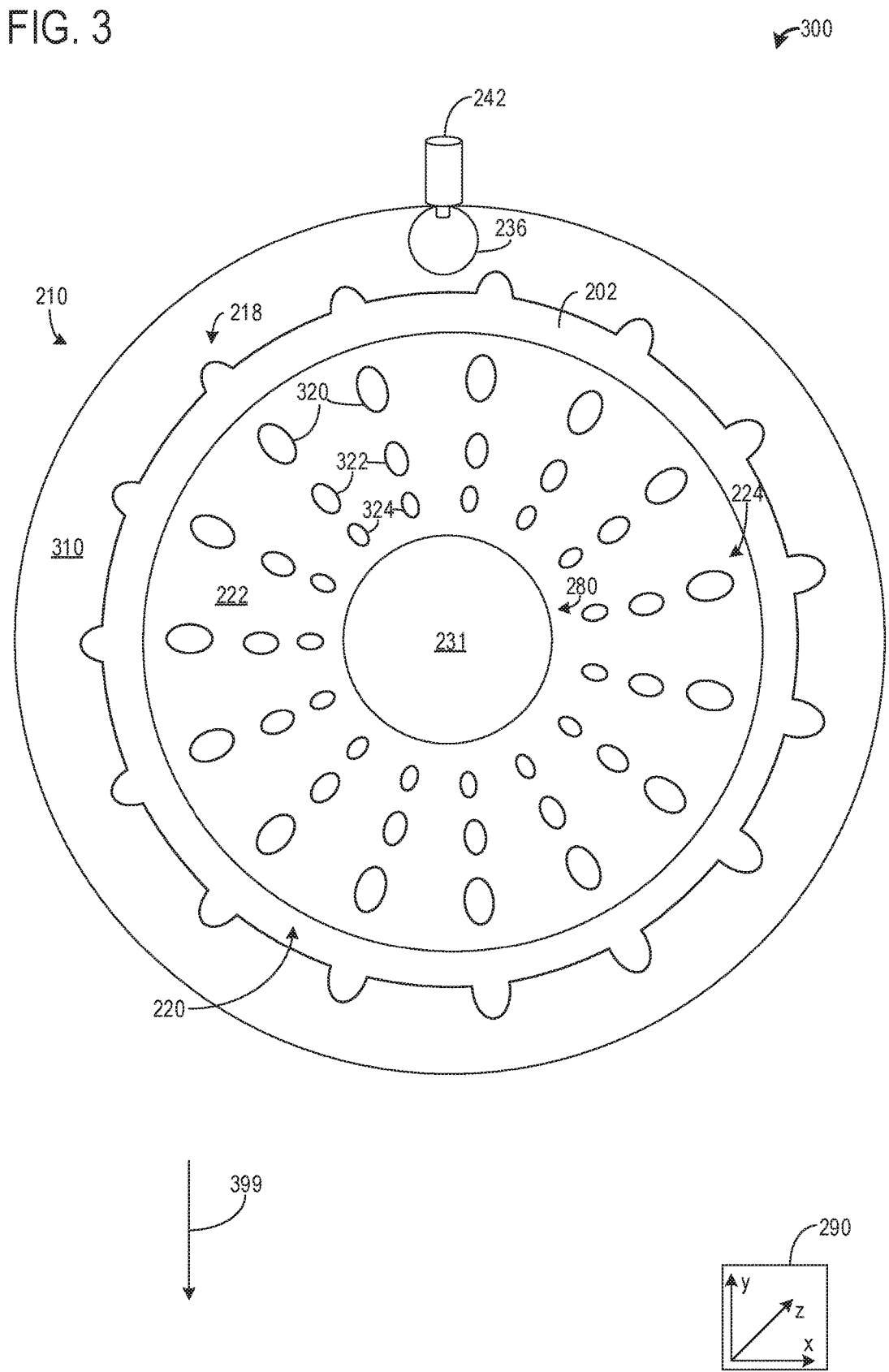
FIG. 3 shows a downstream-to-upstream face-on view of the mixer.
Figure 4:
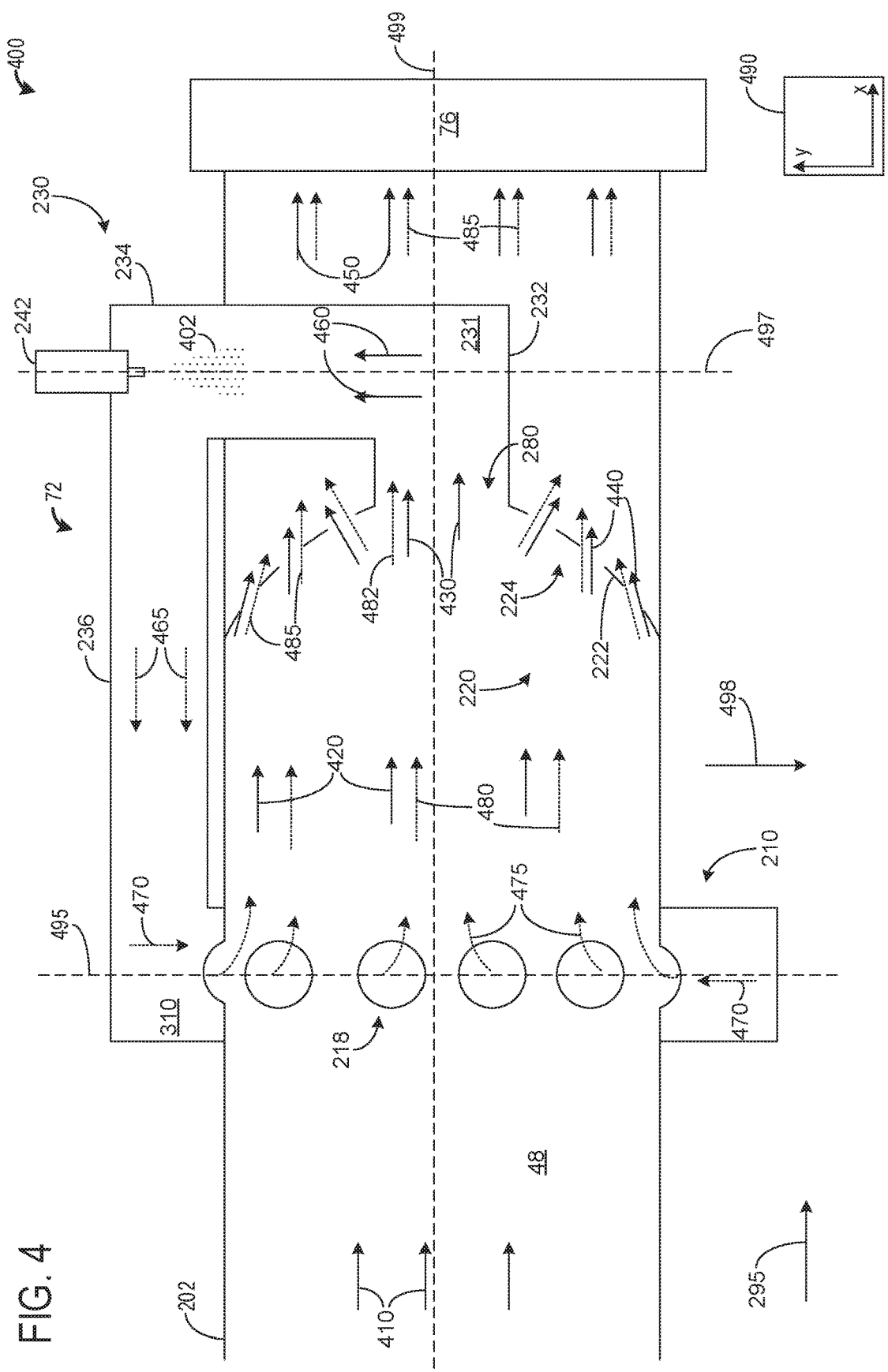
FIG. 4 shows a cross-sectional view of the mixer with an example exhaust flow being conducted through the mixer.

The following description relates to systems and methods for a urea mixer configured to receive a urea injection from an injector. The urea mixer may be located upstream of an SCR catalyst, as shown in FIG. 1. The urea mixer comprises an upstream portion located outside of an exhaust pipe and a downstream portion located interior to the exhaust pipe, as shown in FIG. 2. The downstream portion is physically coupled to an interior surface of the exhaust pipe with an opening located about a central axis of the exhaust pipe. The downstream portion further comprises a plurality of perforations on a curved surface of the downstream portion. The perforations are located between the interior surface of the exhaust pipe and the opening on the curved surface, as shown in FIG. 3. As such, exhaust flows through either the opening or the perforations upon reaching the downstream portion. An example exhaust flow through the urea mixer is shown in FIG. 4. The exhaust gas is diverted from the exhaust passage in the exhaust pipe to the auxiliary passage, where the exhaust gas may mix with a urea injection outside of the exhaust pipe. The mixture flows back to the exhaust passage at a location upstream of where the exhaust gas was diverted. The mixture may then flow through the perforations of the downstream portion, where the mixture is further mixed with exhaust gas, or the mixture may flow through the opening to further mix with another urea injection.

Specifically, the figures show a mixer comprising a concave plate located along an exhaust passage with a central opening fluidly coupling the exhaust passage to an auxiliary passage having a urea injector, and where the auxiliary passage is fluidly coupled to a hollow ring physically coupled to an outer surface of an exhaust pipe, and where the hollow ring is upstream of the concave plate relative to a direction of incoming exhaust gas flow. The concave plate comprises a plurality of perforations angled relative to a direction of incoming exhaust gas flow. The concave plate further comprises an opening defined by the smallest circumference of the concave plate, and where the opening admits exhaust gas into the auxiliary passage. The auxiliary passage is formed by a J-shaped tube comprising a first tube, a second tube, and a third tube, and where a diameter of the auxiliary passage is less than a diameter of the exhaust pipe. The first tube is located inside the exhaust pipe and is physically coupled to the concave plate and a portion of the second tube located in the exhaust pipe, the urea injector is located at an intersection between the third tube and the second tube outside of the exhaust pipe, and where the third tube is entirely located outside of the exhaust pipe and is physically coupled to a downstream surface of the hollow ring. The hollow ring and concave plate are concentric about a central axis of the exhaust pipe, and where incoming exhaust gas flow is parallel to the central axis of the exhaust pipe. The hollow ring comprises a plurality of perforations located along the outer surface of the exhaust pipe, and where the perforations are located along a central axis of the hollow ring, the central axis of the hollow ring being perpendicular to a central axis of the exhaust pipe. The perforations expel exhaust gas to the exhaust passage in a radially inward direction oblique to a direction of incoming exhaust gas flow. The hollow ring comprises an annular chamber uninterruptedly spanning an entire circumference of the exhaust pipe, and where the annular chamber is fluidly coupled to the exhaust passage via the plurality of perforations. The auxiliary passage receives exhaust gas adjacent the concave plate proximal to a central axis of the exhaust pipe, and where the auxiliary passage expels exhaust gas to the exhaust passage via the hollow ring adjacent the exhaust pipe.

FIGS. 1-4 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred to as such, in one example. It will be appreciated that one or more components referred to as being "substantially similar and/or identical" differ from one another according to manufacturing tolerances (e.g., within 1-5% deviation).

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector 69 may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of the exhaust gas sensor 126. The device 70 may be a three way catalyst (TWC), particulate filter, various other emission control devices, or combinations thereof. In some examples, during operation of the engine 10, the emission control device 70 may be periodically reset by operating at least one cylinder of the engine within a particular air-fuel ratio.

A selective catalytic reduction (SCR) device 76 is shown arranged along the exhaust passage 48 downstream of the emission control device 70. The SCR device 76 comprises one or more catalysts capable of reducing pollutants in an exhaust gas stream. However, the catalysts change to a higher oxidation state after the reduction/oxidation reaction. As such, a reductant is introduced upstream of the SCR device 76 to reduce the catalysts back to a lower oxidation state capable of reducing pollutants.

Reductant may be provided from a reductant reservoir 74 fluidly coupled to an injector of a mixer 72 located between the emission control device 70 and the SCR device 76. Thus, the mixer 72 may sufficiently agitate the urea and increase its dispersion into the exhaust gas without overly agitating the reductant such that deposits form. This may improve reduction of the catalysts in the SCR device 76, thereby decreasing vehicle emissions. In one example, the reductant is urea and the reductant reservoir 74 is a urea reservoir. It will be appreciated that the reductant may not be urea and may be other suitable reductants. The mixer 72 will be described in greater detail below.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed. The controller 12 receives signals from the various sensors of FIG. 1 and employs the various actuators of FIG. 1 to adjust engine operation based on the received signals and instructions stored on a memory of the controller. For example, injecting reductant into the mixer 72 includes actuating an actuator of the injector to receive reductant from the reservoir 74 and to inject the reductant to the mixer 72.

The mixer 72 provides a method for injecting a reductant outside of a main exhaust passage into a tube of a mixer configured with an opening in a downstream portion of the mixer in the main exhaust passage to conduct exhaust gas into the tube for mixing with the reductant; and flowing the reductant and exhaust gas parallel to and outside of the main exhaust passage via the tube to an upstream portion of the mixer configured to angularly expel the reductant and exhaust gas into the main exhaust passage. Expelling the reductant and exhaust gas into the main exhaust passage further includes flowing the reductant and exhaust gas toward the downstream portion, where the reductant and exhaust gas flow through the opening or through a plurality of perforations. The upstream portion is in face-sharing contact with an outer surface of an exhaust pipe of the main exhaust passage, and where the upstream portion flow reductant and exhaust gas to the main exhaust passage via a plurality of outlets angled relative to a direction of incoming exhaust gas flow. Injecting the reductant includes injecting the reductant in a direction opposite exhaust gas flow in the tube.

FIG. 2 shows a side perspective view 200 of the mixer 72 of exhaust passage 48. As such, components previously introduced in FIG. 1 are numbered similarly in subsequent figures. The mixer 72 is shown incorporated in an exhaust passage 48 of an exhaust pipe 202.

An axis system 290 comprising three axes, namely, an x-axis parallel to the horizontal direction, a y-axis parallel to the vertical direction, and a z-axis perpendicular to the x- and y-axes. The axis system 290 may be used to describe the relative positioning of components of the mixer 72. A "height" of the mixer 72 and/or its components may be used to define the extent of the components along the y-axis. Similarly, a "length" of components of the mixer 72 may be used to refer to the physical extent of the components along the x-axis. The physical extent of components along the z-axis may be referred to as a "width." Cutting plane A-A' defines the cross-sectional view of the exhaust pipe 202 and the mixer 72 shown in FIG. 3. Cutting plane B-B' defines the cross-sectional view of the exhaust pipe 202 and the mixer 72 shown in FIG. 4.

The mixer 72 may be a single machined piece composed of a single material. In some examples, the mixer 72 may be composed of different materials comprising one or more of a ceramic, metal alloy(s), silicon, silicon derivative, and other suitable materials capable of withstanding high temperatures while also mitigating frictional forces introduced to an exhaust flow in an exhaust pipe 202. Additionally or alternatively the mixer 72 may comprise one or more coatings and materials such that exhaust may contact surfaces of the mixer 72 without depositing soot or other exhaust gas components on the mixer 72. It will be appreciated that the mixer 72 may be multiple pieces fused together without departing from the scope of the present disclosure.

The exhaust pipe 202 is tubular and configured to conduct exhaust gas through the exhaust passage 48. An upstream portion 210, of the mixer 72, is in face-sharing contact with an exterior surface of the exhaust pipe 202. Thus, a circumference of the upstream portion 210 is correspondingly bigger than the circumference of the exhaust pipe 202. A downstream portion 220, of the mixer 72, is in face-sharing contact with an interior surface of the exhaust pipe 202. As such, a circumference of the downstream portion 220 is correspondingly smaller than the circumference of the exhaust pipe 202. Welds, adhesives, fusions, and/or other suitable coupling elements provide a hermetic seal between the exhaust pipe 202 and the upstream portion 210. The coupling elements listed above may also be used to form a hermetic seal between the exhaust pipe 202 and the downstream portion 220. Alternatively, the mixer 72 may be forcibly slid onto the exhaust pipe 202.

The downstream portion 220 is bowl-shaped, in one example. Additionally or alternatively, the downstream portion 220 is a concave plate. Thus, the downstream portion 220 is angular relative to a direction of exhaust flow (arrow 295). An outer circumference of the downstream portion 220 is in face sharing contact with an interior surface of the exhaust pipe 202. A concave surface 222 of the downstream portion 220 angles away from incoming exhaust flow in the downstream direction toward an interior circumference of the downstream portion 220. As such, the outer circumference is upstream of the interior circumference. A plurality of perforations 224 is located on the concave surface 222 between the outer and interior circumferences. The perforations 224 may be oblong and radially misaligned with one another. In some embodiments, the perforations 224 may be circular, triangular, rectangular, etc. An opening 280 is located interior to the interior circumference of the downstream portion 220. The opening 280 is evenly spaced about a central axis 299 of the exhaust pipe 202.

A J-shaped tube 230 is physically coupled to the downstream portion 220 and the upstream portion 210. The J-shaped tube 230 is tubular and hollow with an auxiliary passage 231 located therein. In one example, the exhaust passage 48 is a main exhaust passage and the auxiliary passage is a secondary exhaust passage. A first tube 232 of the J-shaped tube 230 is physically coupled to the interior circumference of the downstream portion. The first tube 232 is parallel and concentric with the exhaust pipe 202 about the central axis 299. The first tube 232 is configured to receive a portion of exhaust gas flow flowing through opening 280 defined by the interior circumference of the downstream portion 220. In this way, exhaust gas in the exhaust passage flows through either the opening 280 or through the perforations 224 upon reaching the downstream portion 220. Exhaust gas may not flow through the concave surface 222 or through an interface formed by the downstream portion 220 and the exhaust pipe 202.

A second tube 234 is fluidly and physically coupled to the first tube 232 at a 90° bend in the exhaust pipe 202. As such, the second tube 234 is perpendicular to the first tube 232 and the central axis 299. The second tube 234 extends vertically from the first tube 232, through the exhaust pipe 202, and to a location outside of the exhaust pipe 202. In this way, a portion of the second tube 234 is located inside the exhaust pipe 202 while a remaining portion of the second tube 234, distal to the first tube 232, is located outside of the exhaust pipe 202. A urea injector 242 is coupled to the portion of the second tube 234 located outside of the exhaust pipe 202, where a third tube 236 forms an intersection with the second tube 234. The urea injector 242 is positioned to inject urea in a direction toward the first tube 232, perpendicular to the direction of incoming exhaust gas flow in the exhaust pipe 202 (arrow 295) and the central axis 299.

The third tube 236 is fluidly and physically coupled to the second tube 234 at a 90° bend outside the exhaust pipe 202 at a downstream end. As such, the third tube 236 is located outside of and space away from the exhaust pipe 202 for its entire length. The third tube 236 is parallel to the exhaust pipe 202, the first tube 232, and the central axis 299. The third tube 236 is fluidly and physically coupled to a top of the upstream portion 210 at a downstream surface 214. Exhaust gas from the second tube 234 may flow into the third tube 236, where the third tube 236 may conduct the exhaust gas to the upstream portion 210. Exhaust gas may not flow directly out of the third tube 236 to an ambient atmosphere or to the engine.

Diameters of the J-shaped tube 230, including first 232, second 234, and third 236 tubes, are less than a diameter of the exhaust pipe 202. In this way, a cross-sectional flow area of the J-shaped tube 230 is less than a cross-sectional flow area of the exhaust pipe 202.

The upstream portion 210 is annular with surfaces enclosing an annular chamber located therein. The annular chamber is sealed such that exhaust gas in the annular chamber may not flow directly to the engine or an ambient atmosphere. Specifically, the upstream portion 210 comprises an upstream surface 212, a downstream surface 214, and an outer annular surface 216. An outer surface of the exhaust pipe 202 may function as an inner annular surface of the upstream portion 210 such that the outer surface of the exhaust pipe 202 is in direct contact with exhaust gas in the annular chamber of the upstream portion 210. The upstream surface 212 is parallel and substantially identical to the downstream surface 214. An upstream end of the third tube 236 is physically coupled to the downstream surface 214. As such, the downstream surface 214 deviates from the upstream surface 212 in that it comprises an aperture for receiving the third tube 236 and exhaust gas from the auxiliary passage 231 that the upstream surface 212 does not.

The annular chamber of the upstream portion 210 is fluidly coupled to the exhaust passage 48 via a plurality of perforations 218 located on the portion of the exhaust pipe 202 functioning as the inner annular surface. As such, exhaust gas from the annular chamber may flow into the exhaust passage 48 via the perforations 218. In one example, the perforations 218 direct exhaust gas into the exhaust passage in a direction angled to the direction of incoming exhaust gas flow (arrow 295).

As shown, the perforations 218 expel exhaust gas into the exhaust passage 48 at a location adjacent the exhaust pipe 202, while the opening 280 admits exhaust gas to the auxiliary passage at a location adjacent the central axis 299. As such, a likelihood of an exhaust gas/urea mixture flowing into the auxiliary passage is decreased. In one example, the mixture only flows through the perforations 224 of the downstream portion 220 before flowing to a remainder of the exhaust passage 48 (e.g., to SCR device 76 of FIG. 1).

FIG. 3 shows a face-on view 300 of the mixer 72 located along the exhaust passage 48. A cross-section of the upstream portion 210 is shown in view 300 according to cutting plane A-A' of FIG. 2. As such, an annular chamber 310 of the upstream portion 210 is exposed and upstream surface 212 of FIG. 2 is omitted.

The upstream 210 and downstream 220 portions are shown cascaded along the exhaust pipe 202 with the upstream portion 210 being outside the exhaust pipe 202 and the downstream portion 220 located interior to the exhaust pipe 202. Thus, the upstream 210 and downstream 220 portions are concentric about the z-axis in the view 300 (e.g., parallel to central axis 299 of FIG. 2). As shown, a smallest diameter of the upstream portion 210 is bigger than a largest diameter of the downstream portion 220 by a width of the exhaust pipe 202.

The downstream portion 220 is fluidly coupled directly to exhaust gas in the exhaust pipe 202. Whereas the annular chamber 310, of the upstream portion 210, is fluidly coupled to exhaust gas flowing out of the third tube 236 via the auxiliary passage 231. The annular chamber 310 expels exhaust gas through the perforations 218 to a portion of the exhaust passage 48 upstream of the downstream portion 220.

The perforations 218 of the upstream portion 210 are located along a common plane parallel to the x- and y-axes. The perforations 218 are similarly sized and shaped. The perforations 218 are shown equidistant to one another. It will be appreciated that the perforations 218 may be different sizes, shapes, and unevenly distributed along the upstream portion 210. For example, there may be a greater number of perforations 218 located along a bottom of the upstream portion 210, distal to a location of the urea injector 242 relative to a direction of gravity 399. This may force exhaust to flow through the annular chamber 310 for a greater duration of time compared to evenly distributing the perforations 218.

The perforations 224 of the downstream portion 220 are cascaded along the downstream portion 220 such that the perforations 224 are divided into upstream 320, middle 322, and downstream 324 perforations. The upstream perforations 320 are located proximally to the largest diameter of the downstream portion 220. As such, the upstream perforations 320 are also proximal to the exhaust pipe 202. The upstream perforations 320 are located along a common plane parallel to the x- and y-axes. The downstream perforations 324 are located proximally to a smallest diameter of the downstream portion 220, adjacent the opening 280. The downstream perforations 324 are located along a common plane parallel to the x- and y-axes, downstream and parallel to the common plane of the upstream perforations 320. As such, the middle perforations 322 are located between the upstream 320 and downstream 324 perforations. The middle perforations 322 are located on a diameter of the downstream portion 220 smaller than the largest diameter and greater than the smallest diameter. The middle perforations 322 are located along a common plane parallel to the x- and y-axes between the planes of the upstream 320 and downstream 324 perforations.

Each of the upstream 320, middle 322, and downstream 324 perforations comprises a similar number of perforations. As such, the perforations 224 are sized corresponding to a diameter of the downstream portion 220. Thus, the upstream perforations 320 are larger than the middle perforations 322, which are larger than the downstream perforations 324. In some embodiments, the upstream 320, middle 322, and downstream 324 perforations may be similarly sized and as a result, a number of the upstream 320, middle 322, and downstream 324 perforations may be uneven, wherein there is a greater number of upstream perforations 320 than middle 322 or downstream perforations 324. Furthermore, a number of middle perforations 322 is greater than a number of downstream perforations.

The perforations 218, upstream perforations 320, middle perforations 322, and downstream perforations 324 are radially aligned. However, all the perforations of the mixer 72 may be misaligned without departing from the scope of the present disclosure. As shown, the mixer 72 comprises no other inlets or additional outlets other than the perforations 218, perforations 224, and opening 280. In this way, exhaust gas flow through the exhaust pipe is altered by the mixer 72 before flowing through a remainder of the exhaust pipe 202.

Thus, a urea mixer comprises a curved downstream portion and an annular upstream portion cascaded along an exhaust pipe of an exhaust passage, the upstream portion located outside of the exhaust pipe and the downstream portion located interior to the exhaust pipe, a first plurality of perforations located along a portion of the exhaust pipe corresponding to a location of the upstream portion and a second plurality of perforations located along the downstream portion, and an injector positioned to inject urea outside the exhaust passage along an axis parallel to a central axis of the upstream portion into a tube. The downstream portion comprises an opening located along a central axis of the exhaust pipe, and where the opening is configured to admit exhaust gas into a portion of the tube located inside the exhaust pipe. The first plurality of perforations are outlets fluidly coupling an annular chamber of the upstream portion to the exhaust passage, and where exhaust gas flowing out of the first plurality of perforations of the upstream portion flows into the exhaust passage before flowing into the downstream portion. The downstream portion is physically coupled to the exhaust pipe along its outer circumference and comprises an opening interior to its inner circumference, and where the downstream portion is curved and comprises the second plurality of perforations between the outer and inner circumferences. The tube comprises a tube diameter that is less than a diameter of the exhaust pipe. There are no other inlet and no additional outlets other than the first and second pluralities of perforations and the opening of the mixer.

FIG. 4 shows a side-on view 400 of a cross-section of the mixer 72 defined by cutting plane B-B' of FIG. 2. As such, interiors of the first 232, second 234, and third 236 tubes (e.g., auxiliary passage 231) along with the annular chamber 310 of the upstream portion 210 are revealed. FIG. 4 further illustrates an example exhaust flow along with urea mixing. It will be appreciated that many more example exhaust flows may be realized due to the spontaneity of exhaust gas and that FIG. 4 is merely one such example. The exhaust gas flow mixing is shown in conjunction with a urea injection 402. However, it will be appreciated that exhaust gas may be mixed by the mixer 72 in the absence of a urea injection. In this way, the mixer 72 may increase a homogeneity of exhaust gas flow in the absence of the urea injection 402, while further being able to increase urea dispersion in the presence of the urea injection 402. Upstream and downstream direction may be described below relative to a general direction of incoming exhaust flow, which is parallel to arrow 295.

An axis system 490 comprises two axes, an x-axis in the horizontal direction and a y-axis in the vertical direction. A central axis 495 of the upstream portion 210 is shown via a dashed line. Additionally, a central axis 499 of the exhaust pipe 202 is shown via a dashed line. The central axis 499 of the exhaust pipe 202 is perpendicular to the central axis 495 of the upstream portion 210. Arrow 498 indicates a downward direction parallel to a force of gravity. A vertical axis 497 is shown and the urea injector 242 is positioned to inject along the vertical axis 497 parallel to the direction of gravity (arrow 498).

Arrows 410 represent exhaust gas flowing toward the mixer 72 in the exhaust passage 48. In one example, arrows 410 may depict exhaust gas exiting an exhaust manifold. As such, the exhaust gas is unperturbed (e.g., no injections and/or objects affecting its flow). Arrows 410 may also be referred to herein as exhaust gas 410.

The exhaust gas flows passed the upstream portion 210 into an area of the exhaust passage 48 located between the upstream portion 210 and the downstream portion 220, as shown by arrows 420. As such, the exhaust gas does not enter the perforations 218 of the upstream portion 210. Arrows 420 may also be referred to as exhaust gas 420. Exhaust gas 420 is downstream of exhaust gas 410 and is similarly unperturbed.

Exhaust gas 420 may flow through the opening 280, as shown by arrows 430 (e.g., exhaust gas 430), or it may flow through the perforations 224 of the downstream portion 220, as shown by arrows 440 (e.g., exhaust gas 440). Additionally or alternatively, exhaust gas 420 may collide with the concave surface 222, where the exhaust gas ricochets off the surface and proceeds to flow downstream to either the perforations 224 or the opening 280. Exhaust gas flowing through the perforations 224 (e.g., exhaust gas 440) may flow radially spaced about the central axis 499 in directions angled to the central axis 499. As such, portions of exhaust gas 440 above the central axis 499 may mix with portions of exhaust gas 440 below the central axis 499. The exhaust gas 440 may flow downstream of the downstream portion 220, as shown by arrows 450 (e.g., exhaust gas 450), where it may flow uninterruptedly toward SCR 76, in one example.

Exhaust gas 430 flows through the opening 280 into the auxiliary passage 231, proximal to the central axis 499, and enters the first tube 232 of the J-shaped tube 230. Exhaust gas 430 flows perpendicular to arrow 498 in the first tube 232 before turning in a direction opposite arrow 498 as the first tube 232 intersects with the second tube 234. Thus, exhaust gas 430 turns 90° to flow in an upward direction opposite gravity (arrow 498), as shown by arrows 460 (e.g., exhaust gas 460) in the auxiliary passage 231 in the second tube 234.

Exhaust gas 460 collides with urea injection 402, provided by the urea injector 242, in the second tube 234 before turning to enter the third tube 236. Thus, exhaust gas 460 flows opposite gravity in the second tube 234 before turning in a direction perpendicular gravity to enter the third tube 236. As such, exhaust gas in the first 232 and third 236 tubes flows perpendicular to gravity. However, exhaust gas in the first tube 232 flows in a downstream direction and exhaust gas in the third tube 236 flows in an upstream direction. Exhaust gas in the third tube 236 is depicted by dashed arrows 465 (e.g., exhaust gas 465). Dashed arrows indicate a mixture of exhaust gas and urea while solid line arrows (e.g., arrows 410, 420, 430, 440, 450, and 460) indicate exhaust gas unmixed with urea).

In this way, exhaust gas 460 mixes with the urea injection 402 in a location outside of the exhaust passage 48. This may allow exhaust gas 460 to sufficiently heat and agitate the urea injection 402 for a desired urea mixing. By doing this, an undesired amount of urea deposits may be prevented from forming in the auxiliary passage 231 or in the exhaust passage 48.

Exhaust gas 465 flows uninterruptedly through the third tube 236, outside of the exhaust passage 48, before entering the annular chamber 310. A direction of exhaust gas 465 is opposite a direction of incoming engine exhaust gas flow (arrow 410). Arrows 470 (e.g., exhaust gas 470) depicts exhaust gas in the annular chamber 310, where exhaust gas 470 may flow uninterruptedly around an entire circumference of the exhaust pipe 202. Exhaust gas 470 may exit the annular chamber 310 and enter the exhaust passage 48 via the perforations 218, as shown by arrows 475 (e.g., exhaust gas 475). Exhaust gas 475 flows in a radially inward direction into the exhaust passage 48, angled and/or perpendicular to arrow 295. Exhaust gas 475 flows proximally to the exhaust pipe 202 due to the proximity of the perforations 218 to the exhaust pipe 202. Exhaust gas 475 flows toward the space between the upstream portion 210 and the downstream portion 220, as shown by arrows 480 (e.g., exhaust gas 480).

Exhaust gas 480 merges with exhaust gas 420. As such, unmixed exhaust gas 420 (e.g., exhaust gas that has not mixed with urea) combines with mixed exhaust gas 480. Exhaust gases 420 and 480 flow toward the downstream portion 220, where they may flow through the perforations 224 or through the opening 280. As such, exhaust gas 480 may enter the second tube 234, as shown by arrow 482. However, it will be appreciated that a relatively small amount of exhaust gas 480 flows through the opening 280 due to the proximity of exhaust gas 480 to the exhaust pipe 202. Said another way, exhaust gas 480 is proximal to exhaust pipe 202 prior to flowing to the downstream portion 220 and as a result, a relatively low amount of the exhaust gas 480 may deviate from its initial flow and flow along the central axis 499 to flow into the opening 280. Thus, a majority of exhaust gas 480 flows through the perforations 224, where its flow direction is perturbed such that it flows in radially inward and outward directions, as shown by arrows 485 (e.g., exhaust gas 485). In this way, mixed exhaust gas 485 flows to all regions of the exhaust passage

48 (e.g., proximal to the exhaust pipe 202 and central axis 499). As such, exhaust gas 450 and 485 have urea dispersed along a plurality of regions of the exhaust passage prior to flowing into the SCR device 76.

Thus, urea is evenly distributed into a main exhaust passage after mixing with exhaust gas in a tube outside of the main exhaust passage. The mixture of exhaust gas and urea flows into the main exhaust passage upstream of a downstream portion of a mixer configured to alter a direction of exhaust flow to distribute the urea to a plurality of regions of the main exhaust passage. In this way, the downstream portion evenly distributes urea throughout the exhaust passage, despite the mixture entering the main exhaust passage adjacent an exhaust pipe upstream of the downstream portion. This allows an SCR device downstream of the mixer to receive an exhaust gas mixer greater in homogeneity compared to an exhaust flow unperturbed by the mixer. Thus, urea may more evenly coat the SCR In this way, a compact, easy-to-design mixer may be located along an exhaust passage upstream of an SCR device. The mixer may further comprise a urea injector located in a tube of the mixer outside of the exhaust passage. The mixer is configured to receive a portion of exhaust gas from the exhaust passage and direct the exhaust gas to the tube housing the urea injector. The technical effect of flowing exhaust gas to the urea injector outside of the exhaust passage is to properly heat the injected urea without overly agitating the urea injection. Thus, the urea mixer may increase urea mixing with exhaust gas by flowing the urea/exhaust gas mixture back to the exhaust passage and by flowing the mixture through a plurality of perforations to be distributed throughout the exhaust passage upstream of the SCR.

A mixer comprising a concave plate located inside an exhaust passage with an opening fluidly coupling the exhaust passage to an auxiliary passage having a urea injector, and where the auxiliary passage is fluidly coupled to a hollow ring physically coupled to an outer surface of the exhaust passage, and where the hollow ring is upstream of the concave plate relative to a direction of incoming engine exhaust gas flow. A first example of the mixer further includes where the concave plate comprises a plurality of perforations angled relative to the direction of incoming exhaust gas flow, and flow in the auxiliary passage flows in an opposite direction to the incoming engine exhaust gas flow. A second example of the mixer, optionally including the first example, further includes where the opening is defined by the smallest circumference of the concave plate, and where the opening admits exhaust gas into the auxiliary passage. A third example of the mixer, optionally including the first and/or second examples, further includes where the auxiliary passage is formed by a J-shaped tube comprising a first tube, a second tube, and a third tube, and where a diameter of the auxiliary passage is less than a diameter of the exhaust pipe. A fourth example of the mixer, optionally including one or more of the first through third examples, further includes where the first tube is located inside the exhaust pipe and is physically coupled to the concave plate and a portion of the second tube located in the exhaust pipe, the urea injector is located at an intersection between the third tube and the second tube outside of the exhaust pipe, and where the third tube is entirely located outside of the exhaust pipe and is physically coupled to a downstream surface of the hollow ring. A fifth example of the mixer, optionally including one or more of the first through fourth examples, further includes where the hollow ring and concave plate are concentric about a central axis of the exhaust pipe, and where the direction of incoming exhaust gas flow is parallel to the central axis of the exhaust pipe. A sixth example of the mixer, optionally including one or more of the first through fifth examples, further includes where the hollow ring comprises a plurality of perforations located along the outer surface of the exhaust pipe, and where the perforations are located along a central axis of the hollow ring, the central axis of the hollow ring being perpendicular to a central axis of the exhaust pipe. A seventh example of the mixer, optionally including one or more of the first through sixth examples, further includes where the perforations expel exhaust gas to the exhaust passage in a radially inward direction oblique to a direction of incoming exhaust gas flow. An eighth example of the mixer, optionally including one or more of the first through seventh examples, further includes where the hollow ring comprises an annular chamber uninterruptedly spanning an entire circumference of the exhaust pipe, and where the annular chamber is fluidly coupled to the exhaust passage via the plurality of perforations. A ninth example of the mixer, optionally including one or more of the first through eighth examples, further includes where the auxiliary passage receives exhaust gas adjacent the opening of the concave plate proximal to a central axis of the exhaust pipe, and where the auxiliary passage expels exhaust gas to the exhaust passage via the hollow ring adjacent the exhaust pipe.

A method comprising injecting a reductant outside of a main exhaust passage into a tube of a mixer configured with an opening in a downstream portion of the mixer in the main exhaust passage to conduct exhaust gas into the tube for mixing with the reductant outside the main exhaust passage, and flowing the reductant and exhaust gas parallel to and outside of the main exhaust passage via the tube to an upstream portion of the mixer configured to angularly expel the reductant and exhaust gas into the main exhaust passage. A first example of the method further includes where expelling the reductant and exhaust gas into the main exhaust passage further includes flowing the reductant and exhaust gas toward the downstream portion, where the reductant and exhaust gas flow through the opening or through a plurality of perforations. A second example of the method optionally including the first example, further includes where the upstream portion is in face-sharing contact with an outer surface of an exhaust pipe of the main exhaust passage, and where the upstream portion flows reductant and exhaust gas to the main exhaust passage via a plurality of outlets angled relative to a direction of incoming exhaust gas flow. A third example of the method, optionally including the first and/or second examples, further includes where injecting the reductant includes injecting the reductant in a direction opposite exhaust gas flow in the tube.

A urea mixer comprising a curved downstream portion and an annular upstream portion cascaded along an exhaust pipe of an exhaust passage, the upstream portion located outside of the exhaust pipe and the downstream portion located interior to the exhaust pipe, a first plurality of perforations located along a portion of the exhaust pipe corresponding to a location of the upstream portion and a second plurality of perforations located along the downstream portion, and an injector positioned to inject urea outside the exhaust passage along a vertical axis parallel to a central axis of the upstream portion into a tube. A first example of the urea mixer further includes where the downstream portion comprises an opening located along a central axis of the exhaust pipe, and where the opening is configured to admit exhaust gas into a portion of the tube located inside the exhaust pipe. A second example of the urea mixer, optionally including the first example, further includes where the first plurality of perforations are outlets fluidly coupling an annular chamber of the upstream portion to the exhaust passage, and where exhaust gas flowing out of the first plurality of perforations of the upstream portion flows into the exhaust passage before flowing into the downstream portion. A third example of the urea mixer, optionally including the first and/or second mixer, further includes where the downstream portion is physically coupled to the exhaust pipe along its outer circumference and comprises an opening interior to its inner circumference, and where the downstream portion is curved and comprises the second plurality of perforations between the outer and inner circumferences. A fourth example of the urea mixer, optionally including one or more of the first through third examples, further includes where the tube comprises a tube diameter that is less than a diameter of the exhaust pipe. A fifth example of the urea mixer, optionally including one or more of the first through fourth examples, further includes where there are no other inlet and no additional outlets other than the first and second pluralities of perforations and the opening.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A mixer comprising:
a concave plate located inside an exhaust passage with an opening fluidly coupling the exhaust passage to an auxiliary passage having a urea injector, and where the auxiliary passage is fluidly coupled to a hollow ring physically coupled to an outer surface of the exhaust passage, and where the hollow ring is upstream of the concave plate relative to a direction of incoming engine exhaust gas flow, the hollow ring fluidly coupled to the exhaust passage via a plurality of perforations circumferentially surrounding the exhaust passage,
wherein the auxiliary passage is formed by a J-shaped tube comprising a first tube, a second tube, and a third tube, and where a diameter of the auxiliary passage is less than a diameter of the exhaust passage, and
wherein the first tube is located inside the exhaust passage and is physically coupled to the concave plate and a portion of the second tube located in the exhaust passage, the urea injector is located at an intersection between the third tube and the second tube outside of the exhaust passage, and where the third tube is entirely located outside of the exhaust passage and is physically coupled to a downstream surface of the hollow ring.

2. The mixer of claim 1, wherein the plurality of perforations are angled relative to the direction of incoming exhaust gas flow, and flow in the auxiliary passage flows in an opposite direction to the incoming engine exhaust gas flow.

3. The mixer of claim 1, wherein the opening is defined as a perforation of the concave plate, and where the opening admits exhaust gas into the auxiliary passage.

4. The mixer of claim 1, wherein the hollow ring and the concave plate are concentric about a central axis of the exhaust passage, and where the direction of incoming exhaust gas flow is parallel to the central axis of the exhaust passage.

5. The mixer of claim 1, wherein the hollow ring comprises the plurality of perforations located along the outer surface of the exhaust passage, and where the plurality of perforations is located along a central axis of the hollow ring, the central axis of the hollow ring being perpendicular to a central axis of the exhaust passage.

6. The mixer of claim 5, wherein the plurality of perforations expel exhaust gas to the exhaust passage in a radially inward direction oblique to the direction of incoming exhaust gas flow.

7. The mixer of claim 5, wherein the hollow ring comprises an annular chamber uninterruptedly spanning an entire circumference of the exhaust passage, and where the annular chamber is fluidly coupled to the exhaust passage via the plurality of perforations.

8. The mixer of claim 1, wherein the auxiliary passage receives exhaust gas adjacent the opening of the concave plate proximal to a central axis of the exhaust passage, and where the auxiliary passage expels exhaust gas to the exhaust passage via the hollow ring adjacent the exhaust passage.

9. A method comprising:
injecting a reductant outside of a main exhaust passage into a tube of a mixer configured with an opening in a downstream portion of the mixer in the main exhaust passage to conduct exhaust gas into the tube for mixing with the reductant outside the main exhaust passage;

flowing the reductant and exhaust gas parallel to and outside of the main exhaust passage via the tube into an upstream hollow ring portion of the mixer, wherein the tube is physically coupled to a downstream surface of the upstream hollow ring portion of the mixer, the downstream surface of the upstream hollow ring portion of the mixer being perpendicular to an outer annular surface of the upstream hollow ring portion of the mixer, and wherein the upstream hollow ring portion of the mixer is physically coupled to an outer surface of the main exhaust passage; and flowing the reductant and exhaust gas out of the upstream hollow ring portion of the mixer and into the main exhaust passage via a plurality of perforations circumferentially surrounding the main exhaust passage, the plurality of perforations configured to angularly expel the reductant and exhaust gas into the main exhaust passage.

10. The method of claim 9, wherein expelling the reductant and exhaust gas into the main exhaust passage further includes flowing the reductant and exhaust gas toward the downstream portion, where the reductant and exhaust gas flow through the opening or through the plurality of perforations.

11. The method of claim 9, wherein the upstream hollow ring portion is in face-sharing contact with an outer surface of an exhaust pipe of the main exhaust passage, and where the upstream hollow ring portion flows reductant and exhaust gas to the main exhaust passage via a plurality of outlets angled relative to a direction of incoming exhaust gas flow.

12. The method of claim 9, wherein injecting the reductant includes injecting the reductant in a direction opposite exhaust gas flow in the tube.

13. A urea mixer comprising:

a curved downstream portion and an annular upstream portion cascaded along an exhaust pipe of an exhaust passage, where the upstream portion is a hollow ring located outside of the exhaust pipe and physically coupled to an outer surface of the exhaust pipe, and where the downstream portion is located interior to the exhaust pipe;

a first plurality of perforations circumferentially surrounding a portion of the exhaust pipe corresponding to a location of the upstream portion, where the first plurality of perforations fluidly couple the upstream portion and the exhaust pipe, and a second plurality of perforations located along the downstream portion; and an injector positioned to inject urea outside the exhaust passage along a vertical axis parallel to a central axis of the upstream portion into a tube, the tube coupling the curved downstream portion and the hollow ring, wherein the tube is physically coupled to a downstream surface of the hollow ring, the downstream surface of the hollow ring being perpendicular to an outer annular surface of the hollow ring.

14. The urea mixer of claim 13, wherein the downstream portion comprises an opening located along a central axis of the exhaust pipe, and where the opening is configured to admit exhaust gas into a portion of the tube located inside the exhaust pipe.

15. The urea mixer of claim 13, wherein the first plurality of perforations are outlets fluidly coupling an annular chamber of the upstream portion to the exhaust passage, and where exhaust gas flowing out of the first plurality of perforations of the upstream portion flows into the exhaust passage before flowing into the downstream portion.

16. The urea mixer of claim 13, wherein the downstream portion is physically coupled to the exhaust pipe along its circumference and comprises an opening, and where the downstream portion is curved and further comprises the second plurality of perforations.

17. The urea mixer of claim 13, wherein the tube comprises a tube diameter that is less than a diameter of the exhaust pipe.

18. The urea mixer of claim 13, wherein there are no other inlets and no additional outlets of the urea mixer other than the first and second pluralities of perforations and an opening of the downstream portion.

* * * * *